United States Patent
Pan et al.

(10) Patent No.: US 12,426,991 B2
(45) Date of Patent: Sep. 30, 2025

(54) ROOT CANAL FLUID FILLING DEVICE AND METHOD

(71) Applicants: Beihang University, Beijing (CN); Peking Union Medical College Hospital, Beijing (CN)

(72) Inventors: Chong Pan, Beijing (CN); Yue Yu, Beijing (CN); Yanpeng Liu, Beijing (CN); Jiangsheng Wang, Beijing (CN); Xinyu He, Beijing (CN); Jizhi Zhao, Beijing (CN)

(73) Assignees: Beihang University, Beijing (CN); Peking Union Medical College Hospital, Beijing (CN)

( * ) Notice: Subject to any disclaimer, the term of this patent is extended or adjusted under 35 U.S.C. 154(b) by 200 days.

(21) Appl. No.: 18/496,589

(22) Filed: Oct. 27, 2023

(65) Prior Publication Data
US 2024/0315803 A1   Sep. 26, 2024

(30) Foreign Application Priority Data

Oct. 28, 2022 (CN) .......................... 202211333673.X

(51) Int. Cl.
*A61C 5/50* (2017.01)
*A61C 5/30* (2017.01)

(52) U.S. Cl.
CPC . *A61C 5/50* (2017.02); *A61C 5/30* (2017.02)

(58) Field of Classification Search
CPC ................ A61C 5/50; A61C 5/30; A61C 5/40
USPC ................................................ 433/80–89, 224
See application file for complete search history.

(56) References Cited

U.S. PATENT DOCUMENTS

| 2018/0360563 | A1* | 12/2018 | Khakpour | ............ A61C 17/024 |
| 2023/0022589 | A1* | 1/2023 | Bergheim | ................ A61C 5/44 |
| 2023/0310132 | A1* | 10/2023 | Khakpour | ............ A61C 1/0046 |
| | | | | 433/215 |

FOREIGN PATENT DOCUMENTS

| CN | 119074268 A | * | 12/2024 | ............ A61C 19/04 |
| KR | 102322846 B1 | * | 11/2021 | ............ B33Y 10/00 |
| KR | 20220039186 A | * | 3/2022 | ................ A61C 5/40 |

* cited by examiner

*Primary Examiner* — Sunil K Singh
(74) *Attorney, Agent, or Firm* — Bochner PLLC; Andrew Bochner

(57) ABSTRACT

Disclosed are a root canal fluid filling device and method. The root canal fluid filling device includes a root canal filling device box, including an upper box body and a lower box body which are arranged in upper and lower partitions and detachable; a positive and negative pressure generating apparatus, arranged in the lower box body; an air pressure monitoring apparatus, arranged in the lower box body and connected to the positive and negative pressure generating apparatus; an air pressure recovery apparatus, arranged in the lower box body; an auxiliary positioning apparatus, including an auxiliary positioning crown which is respectively connected to the positive and negative pressure generating apparatus, the air pressure monitoring apparatus and the air pressure recovery apparatus and is to be sleeved outside and cemented to a tooth to be subjected to root canal therapy; a control display apparatus; and a power supply apparatus.

9 Claims, 4 Drawing Sheets

ROOT CANAL FLUID FILLING DEVICE AND METHOD

CROSS-REFERENCE TO RELATED APPLICATION

This patent application claims the benefit and priority of Chinese Patent Application No. 202211333673.X, filed with the China National Intellectual Property Administration on Oct. 28, 2022, the disclosure of which is incorporated by reference herein in its entirety as part of the present application.

TECHNICAL FIELD

The present disclosure relates to the technical field of medical devices, and in particular to a root canal fluid filling device and method.

BACKGROUND

Pulpitis and periapical periodontitis are one of the most common diseases in stomatology, with an incidence rate as high as 52% in the general population, primarily characterized by severe toothache and local swelling. Root canal therapy is the preferred treatment, the main treatment process of which is to completely remove inflammatory pulp tissues, bacteria and their metabolites in the pulp chamber and root canal system, and obturate the complex three-dimensional structure of the root canal system, for infection controlling, preventing reinfection and preserving natural teeth. Root canal therapy usually includes the following steps: (1) Establish of pulp access; (2) Mechanical preparation; (3) Chemical preparation; (4) Drying of root canal system; and (5) Obturation. The root canal therapy requires endodontist, which can perform this complicated treatment process. Although standardized root canal therapy can achieve a high cure rate, due to population base of 1.4 billion and the limited number of specialists in China, it still cannot be available in most part of the country.

Root canal obturation is one of the key steps in the whole process of root canal therapy, and its purpose is to seal a full root canal system tightly to prevent reinfection. The basic methods for root canal obturation include a cold lateral compaction technique, a warm vertical technique, and a single-cone technique, all of which are used for filling with gutta percha and root canal paste. In the cold lateral compaction technique, the root canal must be prepared to be a continuous taper and have good apical stop. During the use of the lateral condensation technique, trial point is conducted before filling, and the appropriate main gutta percha point is selected according to the working length of root canal and the prepared apical size of the root canal. After the paste is injected into the root canal, the selected main gutta percha point is inserted into the root canal until the working length is reached. If the root canal is not full, one or more pairs of auxiliary gutta percha points can be inserted beside the original gutta percha point and compacted until the root canal is tightly packed.

The vertical compaction technique with warm gutta percha is another clinical alternative. The warm vertical technique is suitable for fully prepared root canals, which can fill softened gutta percha and paste into irregular root canal system better. During the operation, the nonstandard gutta percha point minus 3-4 mm is inserted into the root canal, and the gutta percha in the root canal is softened with a hot carrier, thus enhancing the fluidity of the gutta percha and making the gutta percha attached to the fine structure in root canal to achieve the ideal obturation effect. Warm vertical technique makes ⅓ root canal at the apical completely sealed, and then the beta-gutta percha segment is added with continuous heating until the obturation is completed. However, the vertical compaction technique with warm gutta-percha has the following shortcomings: (1) High operation difficulty: the vertical compaction technique with warm gutta-percha establishes a stable apical stop in the root canal preparation process, thus preventing gutta-percha materials from exceeding the apical foramen, which requires high operation requirements for mechanical preparation and has certain difficulties. (2) Vast preparation of dentin: as the root canal system needs to be prepared to have a taper of more than 4% to 6% when obturate with the gutta percha, a large number of dentin will be cut off, which leads to decrease of tooth resistance, and even micro-cracks in the apical region, resulting in poor long-term prognosis. (3) Risk of thermal damage: when the warm vertical technique with gutta percha is used for root canal filling, the gutta percha needs to be heated to 150-230° C. for softening. Some scholars believe that the heating apparatus may cause some damage to the cementum, periodontal ligament and alveolar bone of the patient, and the heating time control is subjective and difficult to control accurately, so the clinical application of this technique has certain limitations.

SUMMARY

In view of this, the present disclosure provides a root canal fluid filling device and method, a main objective of which is to achieve the automatic completion of a root canal obturation, simplify the surgical process, shorten the therapy time, lower the technical barrier, reduce the workload of doctors, and save manpower costs for healthcare personnel.

To achieve the objective above, the present disclosure mainly provides the following technical solution:

In one aspect, an embodiment of the present disclosure provides root canal fluid filling device, including:

a root canal filling device box, including an upper box body and a lower box body which are arranged in upper and lower partitions and detachable;

a positive and negative pressure generating apparatus, arranged inside the lower box body and used to inject gases into, or extract gases from, a pulp chamber of a tooth to be subjected to root canal therapy to create a positive or a negative pressure environment;

an air pressure monitoring apparatus, arranged in the lower box body and connected to the positive and negative pressure generating apparatus, and used for real-time monitoring of pressure in the pulp chamber of the tooth to be subjected to root canal therapy;

an air pressure recovery apparatus, arranged in the lower box body and used to communicate the pulp chamber of the tooth to be subjected to root canal therapy with an external environment, thus enabling the pressure in the pulp chamber of the tooth to be subjected to root canal therapy in the positive or negative pressure environment to recover to atmospheric pressure;

an auxiliary positioning apparatus, including an auxiliary positioning crown which is respectively connected to the positive and negative pressure generating apparatus, the air pressure monitoring apparatus and the air pressure recovery apparatus and is used to be fitted onto and cemented to the tooth to be subjected to root canal therapy, where a round hole is located on the top end of the auxiliary positioning crown, and the round hole is hermetically fixed with a root canal filling paste capsule through the interference fit with a sealing soft rubber plug;

a control display apparatus, arranged in the upper box body and respectively connected to the positive and negative pressure generating apparatus, the air pressure monitoring apparatus and the air pressure recovery apparatus, where the control display apparatus is used to control the positive and negative pressure generating apparatus to inject gases into, or extract gases from, the pulp chamber of the tooth to be subjected to root canal therapy to create the positive or negative pressure environment, to control the air pressure recovery apparatus to communicate the pulp chamber of the tooth to be subjected to root canal therapy with the external environment, thus enabling the pressure in the pulp chamber, which is in the positive or negative pressure environment to recover to atmospheric pressure, and to receive and display the pressure in the pulp chamber of the tooth to be subjected to root canal therapy transmitted by the air pressure monitoring apparatus in real time and determine whether the pressure in the pulp chamber of the tooth to be subjected to root canal therapy is in a reasonable range; and a power supply apparatus, arranged in the lower box body and connected to the control display apparatus for supplying power to the control display apparatus.

As above, the positive and negative pressure generating apparatus includes a positive pressure pump, a positive pressure solenoid valve connected to the positive pressure pump, a vacuum pump, and a negative solenoid valve connected to the vacuum pump.

The pressure monitoring apparatus utilizes a pressure sensor.

The air pressure recovery apparatus includes an air pressure recovery solenoid valve.

As above, the auxiliary positioning apparatus further includes two pagoda-shaped connectors installed side by side on the rear side of the box body, and two silicone hoses respectively connected to the two pagoda-shaped connectors in one-to-one correspondence.

The auxiliary positioning crown includes base, and the shape curve of the base is consistent with the side profile of a tooth. The base is respectively connected to the positive pressure solenoid valve, the negative pressure solenoid valve, the pressure sensor and the air pressure recovery solenoid valve through the two silicone hoses, and is used for being fitted onto and cemented to the tooth to be subjected to root canal therapy.

The base is of a shell structure.

The round hole is located on the top end of the base.

As above, the control display apparatus includes a display screen, a controller respectively connected to the air pressure monitoring apparatus and the display screen via an I²C communication protocol, and a driving module connected to the controller. An Arduino board is used as the controller, and the driving module is respectively connected to the positive and negative pressure generating apparatus and the air pressure recovery apparatus.

As above, the power supply apparatus includes a key switch, a power module, a relay module respectively connected to the key switch and the power module, a first buck module connected to the relay module, and a second buck module serially connected to the first buck module. The first buck module is connected to the driving module, and the second buck module is respectively connected to the controller and the display screen.

In another aspect, an embodiment of the present disclosure provides a root canal fluid filling method, including the following steps:

S1, cementation of an auxiliary positioning crown: adjusting a position of the auxiliary positioning crown, and tightly cementing the auxiliary positioning crown to a tooth to be subjected to root canal therapy;

S2, airtightness test: fixing, by a sealing soft rubber plug, a root canal filling paste capsule to the auxiliary positioning crown, and extracting, by a positive and negative pressure generating apparatus, gases from the pulp chamber of the tooth to be subjected to root canal therapy, determining the quality of airtightness between the auxiliary positioning crown and the filling paste capsule as well as the tooth to be subjected to root canal therapy according to whether the pressure change rate in the pulp chamber of the tooth to be subjected to root canal therapy is less than a set threshold;

S3, injection of a filling paste in a negative pressure environment: if the airtightness between the auxiliary positioning crown and the filling paste capsule as well as the tooth to be subjected to root canal therapy is good, turning on a vacuum pump to create a low-pressure environment in the pulp chamber of the tooth to be subjected to root canal therapy, once the absolute pressure in the pulp chamber of the tooth to be subjected to root canal therapy is stabilized at about 1 KPa, turning off the vacuum pump, holding the negative pressure environment in the pulp chamber of the tooth to be subjected to root canal therapy, injecting liquid filling paste, waiting for a period of time, and then recovering, by an air pressure recovery apparatus, pressure in the pulp chamber of the tooth to be subjected to root canal therapy to atmospheric pressure;

S4, filling of a root canal in a positive pressure environment: opening a positive pressure solenoid valve, starting a positive pressure pump to inject air into the pulp chamber of the tooth to be subjected to root canal therapy, after the pressure in the pulp chamber of the tooth to be subjected to root canal therapy is increased to about 150 KPa, waiting for a period of time, pushing the liquid filling paste into a root canal under the pressure difference, and then recovering the pressure in the pulp chamber of the tooth to be subjected to root canal therapy to the atmospheric pressure; and S5, confirmation of the filling effect: taking off the auxiliary positioning crown, sealing the pulp chamber of the tooth to be subjected to root canal therapy with a temporary material, and taking an X-ray dental film to confirm therapeutic effect.

As above, in S1, the method includes: adjusting the position of the auxiliary positioning crown to fit the contour of the tooth to be subjected to root canal therapy, and tightly cementing the auxiliary positioning crown to the tooth to be subjected to root canal therapy with glass ionomer or a resin material.

As above, in S2, the method includes: fixing, by the sealing soft rubber plug, the filling paste capsule to the auxiliary positioning crown, where the sealing soft rubber plug is in interference fit with the filling paste capsule, thus ensuring the good airtightness between the filling paste capsule and the auxiliary positioning crown.

As above, in S2, the method includes: calculating, by a control display apparatus, the pressure change rate in the pulp chamber of the tooth to be subjected to root canal therapy, if the pressure change rate in the pulp chamber of the tooth to be subjected to root canal therapy is less than the set threshold, determining that there is good airtightness between the auxiliary positioning crown and the filling paste capsule as well as the tooth to be subjected to root canal therapy;

if the pressure change rate in the pulp chamber of the tooth to be subjected to root canal therapy is greater than the set threshold, determining that air leakage points exist between the auxiliary positioning crown and the filling paste capsule as well as the tooth to be subjected to root canal therapy; and prior to S3, the method further comprises steps of determining the position of the air leakage points and repairing the air leakage points:

adding physiological saline or deionized water into an isolation barrier until the liquid level is over the auxiliary positioning crown, injecting, by the positive and negative pressure generating apparatus, gas into the pulp chamber of the tooth to be subjected to root canal therapy, determining the position of air bubble generation to identify the air leakage points, and recementing the auxiliary positioning crown or refixing the sealing soft rubber plug and the filling capsule paste until the airtightness between the auxiliary positioning crown and the paste filling capsule as well as the tooth to be subjected to root canal therapy is good.

By means of the above technical solution, the root canal fluid filling device and method provided by the present disclosure at least have the following advantages:

According to the root canal fluid filling device and method of the present disclosure, standardized automatic positive-negative pressure alternate root canal fluid filling device and method are designed, which simplifies the root canal obturation process used in clinical practice, root canal obturation can be automatically achieved by the root canal fluid filling device, and key steps can be manually intervened and executed, thus saving the labor cost of medical personnel. The principle of filling the root canal using the root canal fluid filling device is to use the positive and negative pressure difference. In a negative pressure environment, the air pressure in the root canal is extremely low, reducing the occurrence of airlocks in the apical region, allowing the root canal filling paste to reach the root apex. In a positive pressure environment, the filling paste is pushed towards the apical direction to increase the filling compactness, so the root canal with irregular anatomical shape can be filled. The root canal fluid filling device has a significant advantage over traditional root canal obturation methods. The use of liquid filling paste can reduce the requirement for mechanical preparation of root canals, and does not require heating, thus reducing the damage to tooth tissues.

The above description is only an overview of the technical solutions of the present disclosure. In order to clearly understand the technical means of the present disclosure and enable implementation according to the contents of the specification, the following is a detailed description of the preferred embodiment of the present disclosure with the accompanying drawings.

DETAILED DESCRIPTION OF THE EMBODIMENTS

In order to further illustrate the technical means and effects adopted by the present disclosure to achieve the predetermined purpose of the present disclosure, the specific embodiments, structures, features and effects of the application according to the present disclosure will be described in detail below with reference to the accompanying drawings and preferred embodiments.

Figure 1:
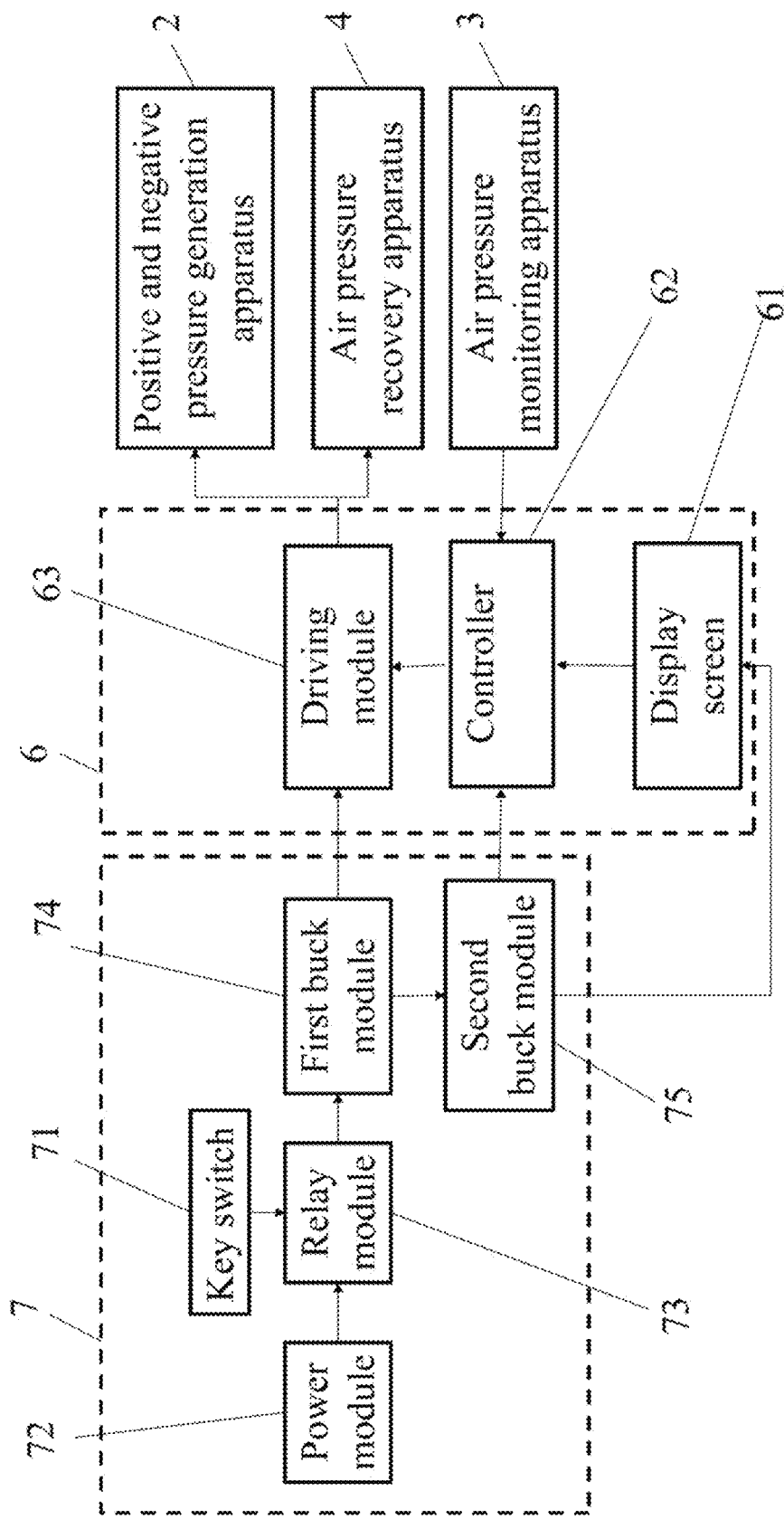
FIG. 1 is a block diagram of the working principle of a root canal fluid filling device according to the present disclosure.
Figure 2:
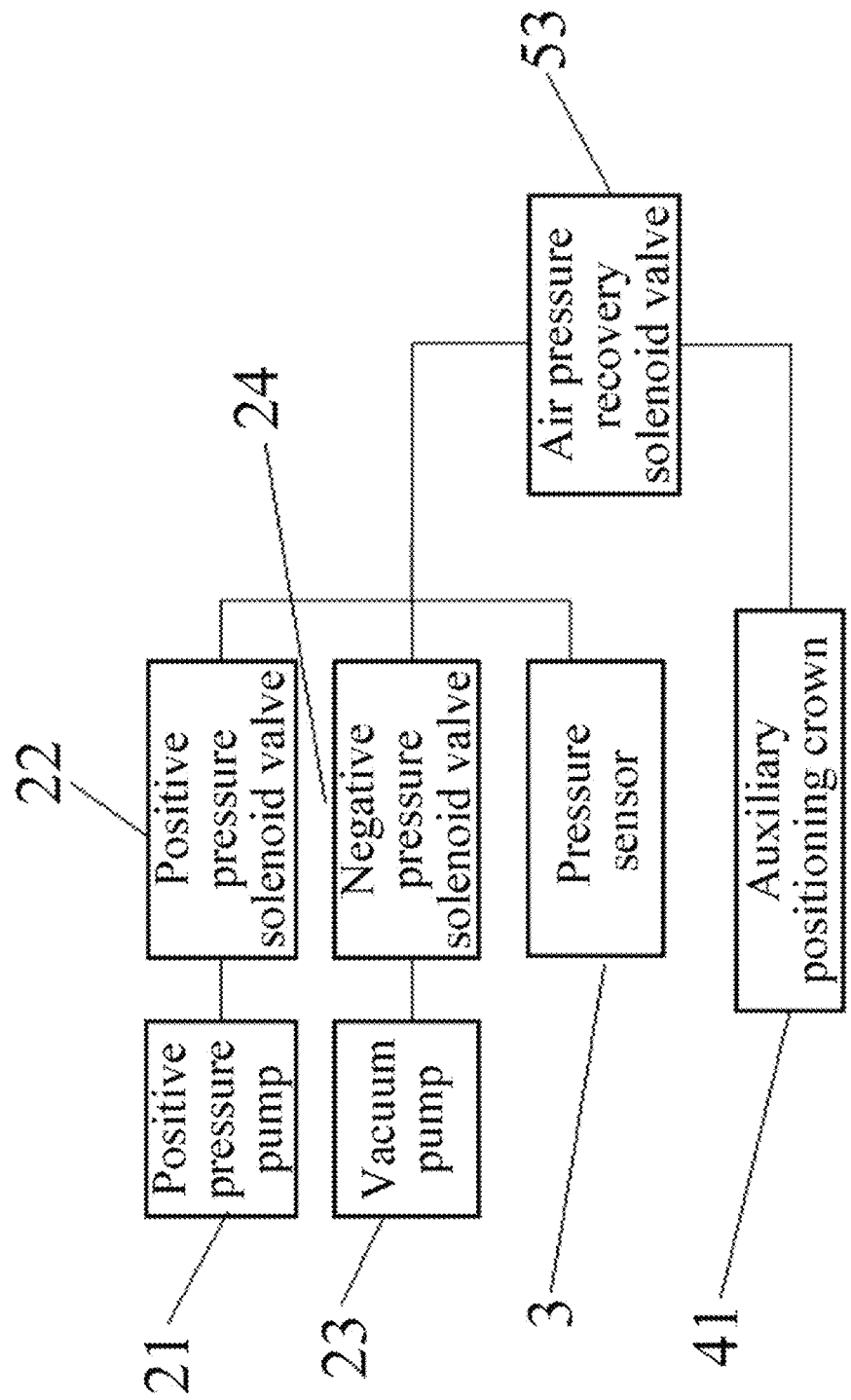
FIG. 2 is a block diagram of a working principle between a positive and negative pressure generating apparatus, an air pressure recovery apparatus, and an auxiliary positioning apparatus according to the present disclosure.
Figure 3:
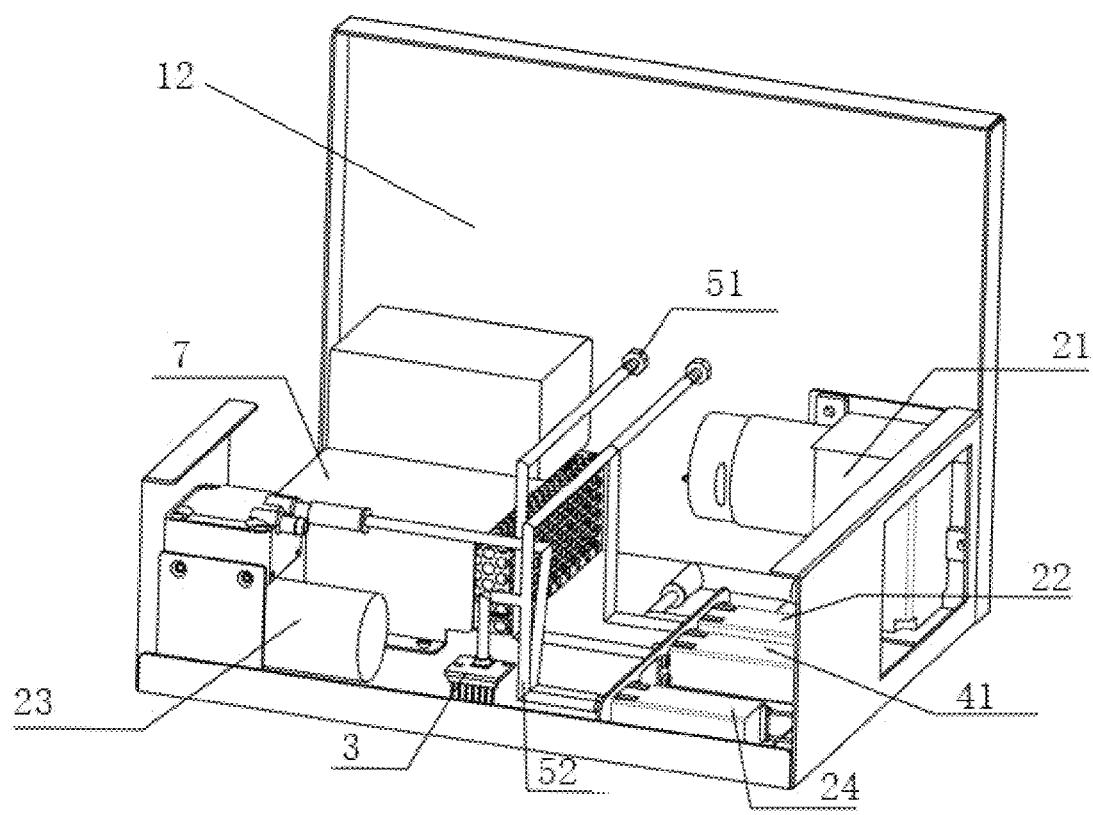
FIG. 3 is a schematic diagram of a connecting structure between a positive and negative pressure generating apparatus, an air pressure recovery apparatus, and an auxiliary positioning apparatus according to the present disclosure.
Figure 4:
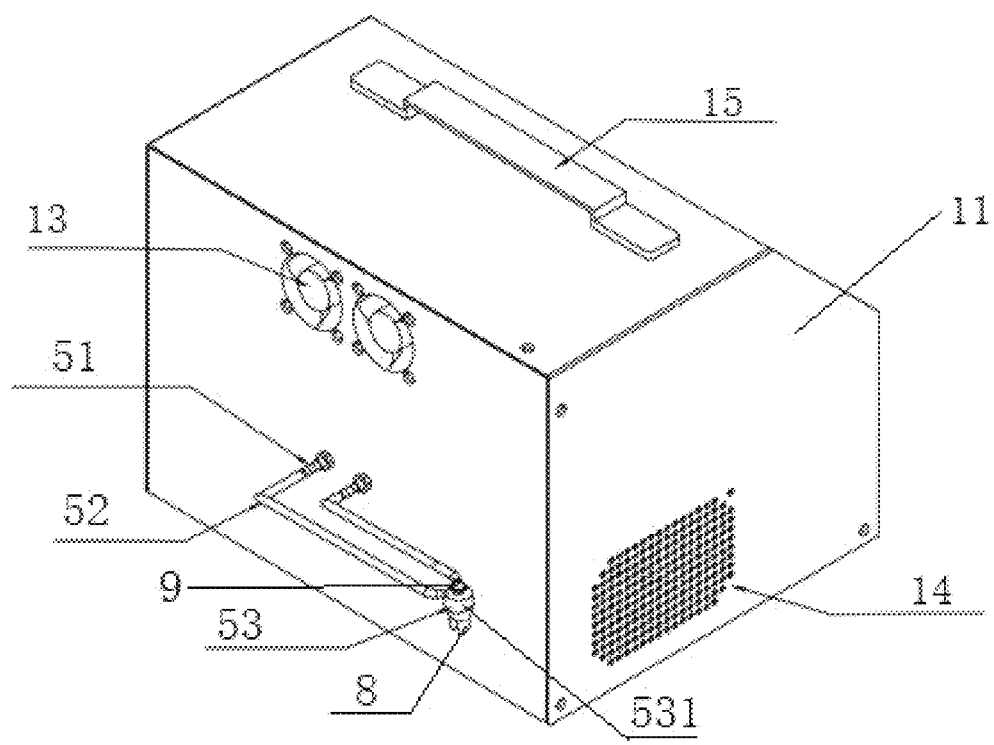
FIG. 4 is a schematic diagram of an auxiliary positioning apparatus and a box body structure according to the present disclosure.

As shown in FIG. 1, a root canal fluid filling device provided by one embodiment of the present disclosure includes a root canal filling device box 1, a positive and negative pressure generating apparatus 2, an air pressure monitoring apparatus 3, an air pressure recovery apparatus 4, an auxiliary positioning apparatus 5, a control display apparatus 6, and a power supply apparatus 7.

As shown in FIG. 1 to FIG. 4, the root canal filling device box 1 includes an upper box body 11 and a lower box body 12 which are arranged in upper and lower partitions and detachable. Two cooling fans 13 are installed on a rear side of the root canal filling device box 1, and are connected to the power supply apparatus 7. Vents 14 are provided in the middle and both sides of the box body 1. In the present disclosure, a handle 15 is installed at the upper end of the root canal filling device box 1 for handholding the device conveniently. The positive and negative pressure generating apparatus 2 is arranged in the lower box body 12 and is used to inject gases into, or extract gases from, a pulp chamber of a tooth 8 to be subjected to root canal therapy, so as to create a positive or negative pressure environment. The positive and negative pressure generating apparatus 2 includes a positive pressure pump 21, a positive pressure solenoid valve 22 connected to the positive pressure pump 21, a vacuum pump 23, and a negative pressure solenoid valve 24 connected to the vacuum pump 23. The air pressure monitoring apparatus 3 is arranged in the lower box body 12 and connected to the positive and negative pressure generating apparatus 2, and is used to monitor pressure in the pulp chamber of the tooth 8 to be subjected to root canal therapy. The air pressure recovery apparatus 4 is arranged in the lower box body 12 and used to communicate the pulp chamber of the tooth 8 to be subjected to root canal therapy with an external environment, thus enabling the pressure in the pulp chamber of the tooth 8 to be subjected to root canal therapy in the positive or negative pressure environment to recover to atmospheric pressure. The air pressure recovery apparatus 4 includes an air pressure recovery solenoid valve 41. The auxiliary positioning apparatus 5 includes two pagoda-shaped connectors 51 installed side by side at a rear side of the box body 1, two silicone hoses 52 respectively connected to the two pagoda-shaped connectors 51 in one-to-one correspondence, and an auxiliary positioning crown 53 respectively connected to the two silicone hoses 52. The auxiliary positioning crown 53 is respectively connected to the positive and negative pressure generating apparatus 2, the air pressure monitoring apparatus 3 and the air pressure recovery apparatus 4 and is used to be fitted onto and cemented to the tooth 8 to be subjected to root canal therapy. A round hole is provided at the top end of the auxiliary positioning crown 53, and the round hole is hermetically fixed with a root canal filling paste capsule through the interference fit with a sealing soft rubber plug 9. The auxiliary positioning crown 53 includes a base 531, the shape curve of the base 531 is consistent with the side profile of a tooth, and the base 531 is respectively connected to the positive pressure solenoid valve 22, the negative pressure solenoid valve 24, a pressure sensor and the air pressure recovery solenoid valve 41 through the two silicone hoses 52, and is used to be fitted onto and cemented to the tooth 8 to subjected to root canal therapy. The base is of a shell structure, and the round hole is located on the top end of the base 531. A control display apparatus 6 is arranged in the upper box body 11 and respectively connected to the positive and negative pressure generating apparatus 2, the air pressure recovery apparatus 3, and the air pressure monitoring apparatus 4. The control display apparatus 6 is used to control the positive and negative pressure generating apparatus 2 to inject gases into, or extract gases from, the pulp chamber of the tooth 8 to be subjected to root canal therapy to create a positive or negative pressure environment, to control the air pressure recovery apparatus 4 to communicate the pulp chamber of the tooth 8 to be subjected to root canal therapy with the external environment, thus enabling the pressure in the pulp chamber in the positive or negative pressure environment to recover to the atmospheric pressure, and to receive and display the pressure in the pulp chamber of the tooth 8 to be subjected to root canal therapy transmitted by the pressure monitoring apparatus 3 in real time and to determine whether the pressure in the pulp chamber of the tooth 8 to be subjected to root canal therapy is in a reasonable range. The control display apparatus 6 includes a display screen 61, a controller 62 respectively connected to the pressure sensor 3 and the display screen 61 via an I²C communication protocol, and a driving module 63 connected to the controller 62. The driving module 63 is respectively connected to the positive and negative pressure generating apparatus 2, and the air pressure recovery apparatus 4. Specifically, the driving module 63 is respectively connected to the positive pressure pump 21, the positive pressure solenoid valve 22, the vacuum pump 23, the negative pressure solenoid valve 24, and the air pressure recovery solenoid valve 41. An Arduino board is used as the controller 62. A voltage signal is transmitted, by the Arduino board and the driving module, to the positive and negative pressure generating apparatus and the air pressure recovery apparatus, so as to achieve various functions of the positive and negative pressure generating apparatus and the air pressure recovery apparatus. In the present disclosure, the controller 62 may also employ a 51 single-chip microcomputer, a STM32 single-chip microcomputer, etc., which is not limited by specific embodiments of the present disclosure. The data is transmitted by the pressure sensor to the Arduino board, and converted by the Arduino board into appropriate units, and then is transmitted to the display screen for displaying the pressure change in the pulp chamber in real time, and the Arduino board determines whether the pressure is within a reasonable range. The power supply apparatus 7 is arranged in the lower box body 12 and connected to the control display apparatus 6 for supplying power to the control display apparatus 6. The power supply apparatus 7 includes a key switch 71, a power module 72, a relay module 73 respectively connected to the key switch 71 and the power module 72, a first buck module 74 connected to the relay module 73, and a second buck module 75 serially connected to the first buck module 74. The first buck module 74 is connected to the driving module 63, and the second buck module is respectively connected to the controller 62 and the display screen 61. In the present disclosure, a 12 V DC-DC adjustable buck module is used as the first buck module 74, and a 5 V DC-DC adjustable buck module is used as the second buck module 75. The power module converts 220 V AC power into DC, and the key switch is used to control the connection and disconnection of the relay module. After the key is pressed down, the relay module connects, two DC-DC adjustable buck modules are used in series after the relay module. The two buck modules output different voltages, so as to satisfy power supply demands of the Arduino board, the display screen, the driving module, and the fan, respectively.

Under alternating positive-negative pressure environment, liquid filling paste is used to fill the root canal, with a specific working principle as follows: The vacuum pump is used to establish a negative pressure environment in the pulp chamber and root canal of the tooth to be subjected to root canal therapy, and the liquid filling paste is injected at absolute pressure of about 1 KPa, the root canal is then sealed by the liquid filling paste. Afterwards, the air pressure in the pulp chamber of the tooth to be subjected to root canal therapy is increased to about 150 KPa. At the moment, as the root canal is sealed, the root canal system remains under negative pressure, so the filling paste is sucked into the root canal system under the action of pressure difference, and as the air pressure in the root canal is extremely low, the airlocks in the apical region is reduced, and the filling paste can be filled to the root apex. At the same time, as the pulp chamber is in a positive pressure environment, the liquid paste is subjected to greater pressure difference, which causes the filling paste to move towards the root canal apex direction, thus increasing the filling compactness. Compared with traditional root canal filling method, filling the root canal with a liquid filling material in the negative pressure environment has obvious advantages for the root canal with complex anatomical shape. Additionally, positive pressure enhances the sealing compactness.

During root canal filling, the root canal experiences both significant negative and positive pressure. Considering safety concerns, the air pressure monitoring apparatus is provided. The air pressure monitoring apparatus remains connected to the pulp chamber of the tooth to be subjected to root canal therapy throughout the root canal filling process. The pressure sensor is used to monitor a pressure value in real time and transmit the pressure value to the controller, and then the pressure value is displayed on the digital display screen. The controller is used to access whether the pressure value in the pulp chamber of the tooth to be subjected to therapy is within a reasonable range. The functional components such as pumps and valves of the root canal fluid filling device are connected by the silicone hoses, adapters and tee connectors to guarantee the airtightness of the pipeline.

Further, the power supply apparatus in the present disclosure may be replaced by other forms, such as integrating various modules into a circuit board, which is not limited by the specific embodiment of the present disclosure.

Further, in the present disclosure, positions of various elements, the shape of the box body and the internal structures of the box can be replaced and adjusted freely.

Further, in the present disclosure, the liquid filling paste may be in the form of capsules or other forms, which is not limited by the specific embodiment of the present disclosure.

Figure 5:
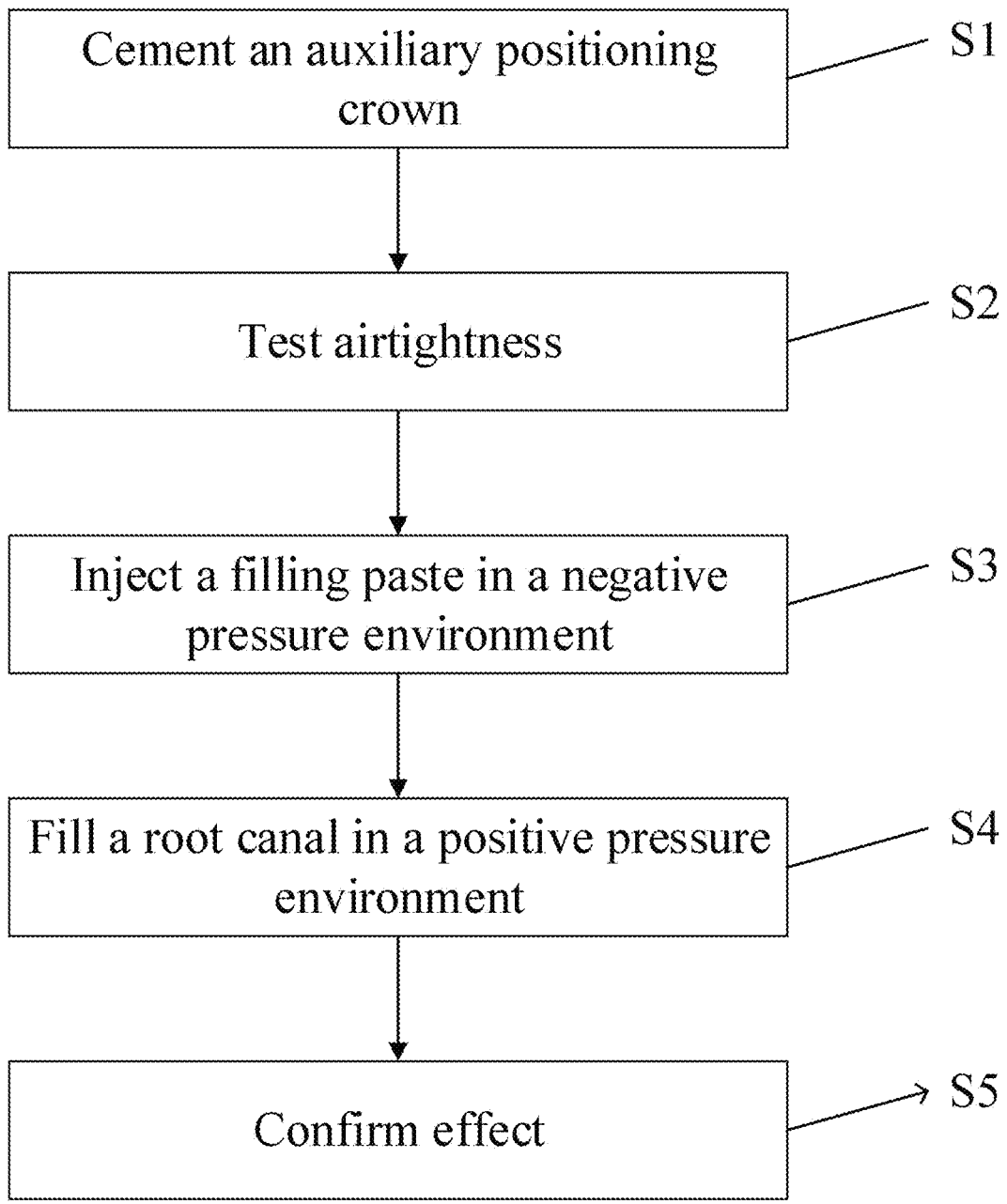
FIG. 5 is a flow diagram of a root canal fluid filling method according to the present disclosure.

In another aspect, a root canal fluid filling method provided by the embodiment of the present disclosure, as shown in FIG. 5, includes the following steps:

S1. Cementation of an auxiliary positioning crown: The position of the auxiliary positioning crown is adjusted to fit with the contour of a tooth to be subjected to root canal therapy of a patient, and the auxiliary positioning crown is cemented to the tooth using glass ionomer or a resin material to guarantee the tight cementation between the auxiliary positioning crown and the tooth to be subjected to root canal therapy, and the root canal fluid filling device is connected to the tooth to be subjected to root canal therapy.

S2. Airtightness test: a filling paste capsule is fixed, by a sealing soft rubber plug, to the auxiliary positioning crown, and the sealing soft rubber plug is in interference fit with the auxiliary positioning crown and the filling paste capsule, thus guaranteeing the good airtightness between the filling paste capsule and the auxiliary positioning crown. A negative pressure solenoid valve is opened, a positive pressure solenoid valve and an air pressure recovery solenoid valve are closed, a vacuum pump is turned on, and then is turned off after about 5 s. A pressure sensor is used to monitor pressure in a pulp chamber of the tooth to be subjected to root canal therapy in real time and to transmit pressure data to an Arduino development board. The Arduino board is used to compute a pressure change rate, if the pressure change rate is less than a set threshold, it is determined that the airtightness between the tooth to be subjected to root canal therapy and the auxiliary positioning crown is good, thus proceeds to the next step. If the pressure change rate is greater than the set threshold, it indicates that air leakage points exist between the tooth to be subjected to root canal therapy and the auxiliary positioning crown. Physiological saline or deionized water is added into a rubber barrier installed before until the liquid level is over the auxiliary positioning crown, the negative pressure solenoid valve and the air pressure recovery solenoid valve are closed, the positive pressure solenoid valve is opened, and a positive pressure pump operates to inject gas into the pulp chamber of the tooth to be subjected to root canal therapy, the position of air bubble generation is used to determine the position of the air leak, and the auxiliary positioning crown is recemented or the sealing soft rubber plug and the filling capsule paste are refixed until the system is airtight. After the airtightness test is finished, all solenoid valves are closed, and the positive pressure pump and the vacuum pump are turned off.

S3. Injection of a liquid filling paste in a negative pressure environment: if the airtightness between the auxiliary positioning crown and the filling paste capsule as well as the tooth to be subjected to root canal therapy is good, the negative pressure solenoid valve is opened, and the positive pressure solenoid valve and the air pressure recovery solenoid valve are closed, the vacuum pump is turned on for continuous air extraction, so as to create a low-pressure environment in the pulp chamber of the tooth to be subjected to root canal therapy, where the pressure is about 1 KPa. After waiting for about 30 seconds for the liquid filling paste to be injected, the air pressure recovery solenoid valve is opened to recover the air pressure in the pulp chamber of the tooth to be subjected to root canal therapy to the normal pressure.

S4. Filling of a root canal in a positive pressure environment: the positive pressure solenoid valve is opened, and the negative pressure solenoid valve and the air pressure recovery solenoid valve are closed, the pulp chamber and root canal system of the tooth to be subjected to root canal therapy are directly connected to the positive pressure pump and the pressure sensor. The positive pressure pump is turned on to inject air into the pulp chamber of the tooth to be subjected to root canal therapy. After the air pressure in the pulp chamber of the tooth to be subjected to root canal therapy increases to about 150 KPa, the filling paste is pushed to towards the root apex, after waiting for about 30 s, the liquid filling paste is pushed into the root canal due to the pressure difference. Then, the air pressure recovery solenoid valve is opened to recover the air pressure in the pulp chamber of the tooth to be subjected to root canal therapy to the atmospheric pressure. In this process, a rotational speed of the positive pressure pump can be adjusted, so as to control the pressure in the pulp chamber of the tooth to be subjected to root canal therapy. Then the device is turned off. After the liquid filling root canal therapy in the alternating positive-negative pressure environment is completed, the positive pressure pump and the vacuum pump are turned off, and three air path solenoid valves are all closed.

S5. Confirmation of filling effect: the auxiliary positioning crown is taken off, the pulp chamber is sealed with a temporary material, and an X-ray dental film is taken to confirm the therapeutic effect.

After the preoperative preparation, the endodontic cavity preparation, the mechanical preparation and chemical preparation of root canal are completed, obturation can be automatically completed by the root canal fluid filling device, and the key steps can be manually intervened by medical personnel.

The root canal fluid filling device and method of the present disclosure are described in detail below with specific embodiments.

Embodiment I

The root canal fluid filling device provided by the present disclosure is used for extracted tooth filling. Before the experiment, the root canals are mechanically prepared to an approximate size and the apical foramen is occluded. During the experiment, the root canal fluid filling device is used to complete the root canal fluid filling process in an alternating positive-negative pressure environment according to the present disclosure. As shown, the root canal fluid filling device of the present disclosure can be used to fill the root canal effectively. The X-ray dental film shows high compactness, and the root canal filling paste can reach lateral branches and the root apex region that have not undergone mechanical preparation and curved root canals with large curvature in apical region.

Embodiment II

The root canal fluid filling device of the present disclosure is also used in clinical treatment, and the root canal fluid filling process in an alternating positive-negative pressure environment according to the present disclosure is adopted.

By comparing the filling results in the positive-negative pressure alternate environment with the principal point tracing picture, it can be found that when the root canal is filled using the root canal fluid filling device of the present disclosure, a position where the paste enters the root canal is almost the same as that where the root canal is filled with gutta percha. It is proved that it is feasible to use root canal fluid filling device to fill the root canal in clinic. In the process of performing root canal filling therapy with the root canal fluid filling device, the patient does not feel obvious discomfort under the condition of local anesthesia.

According to the root canal fluid filling device and method of the present disclosure, standardized automatic positive-negative pressure alternate root canal fluid filling device and method are designed, which simplify the current clinical root canal filling therapy process, root canal filling can be automatically achieved by the root canal fluid filling device, and key steps can be manually intervened and executed, thus saving the labor cost of medical personnel. The principle of filling the root canal using the root canal fluid filling device is to use the pressure difference between positive and negative pressure. In a negative pressure environment, the air pressure in the root canal is extremely low, the airlock at an apical region is reduced, so the filling paste can reach the root canal apex. In a positive pressure environment, the filling paste is pushed towards the apex direction to increase the filling compactness, so the root canal with irregular anatomical shape can be filled. Compared with the traditional root canal therapy, the root canal fluid filling device has great advantages, and the use of liquid filling paste can reduce the requirement for mechanical preparation of root canals, and does not require heating, thus reducing the damage to tooth tissues.

The above is only the preferred embodiment of the present disclosure and is not intended to limit the present disclosure in any form. Any simple modification, equivalent change and enrichment of the above embodiment according to the technical essence of the present disclosure still fall within the scope of the technical solution of the present disclosure.

What is claimed is:

1. A root canal fluid filling device, comprising:
    a root canal filling device box, comprising an upper box body and a lower box body which are arranged in upper and lower partitions and detachable;
    a positive and negative pressure generating apparatus, arranged inside the lower box body and used to inject gases into, or extract gases from, a pulp chamber of a tooth to be subjected to root canal therapy to create a positive or negative pressure environment;
    an air pressure monitoring apparatus, arranged in the lower box body and connected to the positive and negative pressure generating apparatus, and used to monitor pressure in the pulp chamber of the tooth to be subjected to root canal therapy;
    an air pressure recovery apparatus, arranged in the lower box body and used to communicate the pulp chamber of the tooth to be subjected to root canal therapy with an external environment, thus enabling the pressure in the pulp chamber of the tooth to be subjected to root canal therapy located in the positive or negative pressure environment to recover to atmospheric pressure;
    an auxiliary positioning apparatus, comprising an auxiliary positioning crown which is respectively connected to the positive and negative pressure generating apparatus, the air pressure monitoring apparatus and the air pressure recovery apparatus and is used to be fitted onto and cemented to the tooth to be subjected to root canal therapy, wherein a top end of the auxiliary positioning crown is provided with a round hole, and the round hole is hermetically fixed with a filling paste capsule through the interference fit with a sealing soft rubber plug;
    a control display apparatus, arranged in the upper box body and respectively connected to the positive and negative pressure generating apparatus, the air pressure monitoring apparatus and the air pressure recovery apparatus, wherein the control display apparatus is used to control the positive and negative pressure generating apparatus to inject gases into, or extract gases from, the pulp chamber of the tooth to be subjected to root canal therapy to create the positive or negative pressure environment, to control the air pressure recovery apparatus to communicate the pulp chamber of the tooth to be subjected to root canal therapy with the external environment, thus enabling the pressure in the pulp chamber located in the positive or negative pressure environment to recover to the atmospheric pressure, and to receive and display the pressure in the pulp chamber of the tooth to be subjected to root canal therapy transmitted by the air pressure monitoring apparatus in real time and determine whether the pressure in the pulp chamber of the tooth to be subjected to root canal therapy is in a reasonable range; and
    a power supply apparatus, arranged in the lower box body and connected to the control display apparatus for supplying power to the control display apparatus.

2. The root canal fluid filling device according to claim 1, wherein
    the positive and negative pressure generating apparatus comprises a positive pressure pump, a positive pressure solenoid valve connected to the positive pump, a vacuum pump, and a negative solenoid valve connected to the vacuum pump;
    a pressure sensor is used as the air pressure monitoring apparatus; and
    the air pressure recovery apparatus comprises an air pressure recovery solenoid valve.

3. The root canal fluid filling device according to claim 2, wherein
    the auxiliary positioning apparatus further comprises two pagoda-shaped connectors installed side by side at a rear side of the box body, and two silicone hoses respectively connected to the two pagoda-shaped connectors in one-to-one correspondence;
    the auxiliary positioning crown comprises base, the shape curve of the base is consistent with a side profile of the tooth, and the base is respectively connected to the positive pressure solenoid valve, the negative pressure solenoid valve, the pressure sensor and the air pressure recovery solenoid valve through the two silicone hoses, and is used to be fitted onto and cemented to the tooth to be subjected to root canal therapy;
    the base is of a shell structure;
    the round hole is located on the top end of the base.

4. The root canal fluid filling device according to claim 1, wherein
    the control display apparatus comprises a display screen, a controller respectively connected to the air pressure monitoring apparatus and the display screen via an $I^2C$ communication protocol, and a driving module connected to the controller; an Arduino board is used as the controller, and the driving module is respectively connected to the positive and negative pressure generating apparatus and the air pressure recovery apparatus.

5. The root canal fluid filling device according to claim 4, wherein
the power supply apparatus comprises a key switch, a power module, a relay module respectively connected to the key switch and the power module, a first buck module connected to the relay module, and a second buck module serially connected to the first buck module; the first buck module is connected to the driving module, and the second buck module is respectively connected to the controller and the display screen.

6. A root canal fluid filling method, comprising the following steps:
S1, cementation of an auxiliary positioning crown: adjusting a position of the auxiliary positioning crown, and tightly cementing the auxiliary positioning crown to a tooth to be subjected to root canal therapy;
S2, airtightness test: fixing, by a sealing soft rubber plug, a filling paste capsule to the auxiliary positioning crown, and extracting, by a positive and negative pressure generating apparatus, gases from the pulp chamber of the tooth to be subjected to root canal therapy, determining whether airtightness between the auxiliary positioning crown and the filling paste capsule as well as the tooth to be subjected to root canal therapy is good according to whether a pressure change rate in the pulp chamber of the tooth to be subjected to root canal therapy is less than a set threshold;
S3, injection of a filling paste in a negative pressure environment: if the airtightness between the auxiliary positioning crown and the filling paste capsule as well as the tooth to be subjected to root canal therapy is good, turning on a vacuum pump to create a low-pressure environment in the pulp chamber of the tooth to be subjected to root canal therapy, after absolute pressure in the pulp chamber of the tooth to be subjected to root canal therapy is stabilized at about 1 KPa, turning off the vacuum pump, holding the negative pressure environment in the pulp chamber of the tooth to be subjected to root canal therapy, injecting liquid filling paste, waiting for a period of time, and then recovering, by an air pressure recovery apparatus, pressure in the pulp chamber of the tooth to be subjected to root canal therapy to atmospheric pressure;
S4, filling of a root canal in a positive pressure environment: opening a positive pressure solenoid valve, starting a positive pressure pump to inject air into the pulp chamber of the tooth to be subjected to root canal therapy, after air pressure in the pulp chamber of the tooth to be subjected to root canal therapy is increased to about 150 KPa, waiting for a period of time, pushing the liquid filling paste into a root canal under the action of pressure difference, and then recovering the pressure in the pulp chamber of the tooth to be subjected to root canal therapy to the atmospheric pressure; and S5, confirmation of effect: taking off the auxiliary positioning crown, sealing the pulp chamber of the tooth to be subjected to root canal therapy with a temporary material, and taking an X-ray dental film to confirm filling effect.

7. The root canal fluid filling method according to claim 6, wherein
in S1, the method comprises: adjusting the position of the auxiliary positioning crown to attach to the contour of the tooth to be subjected to root canal therapy, and tightly cementing the auxiliary positioning crown to the tooth to be subjected to root canal therapy with glass ionomer or a resin material.

8. The root canal fluid filling method according to claim 6, wherein
in S2, the method comprises: fixing, by the sealing soft rubber plug, the filling paste capsule to the auxiliary positioning crown, wherein the sealing soft rubber plug is in interference fit with the filling paste capsule, thus guaranteeing the good airtightness between the filling paste capsule and the auxiliary positioning crown.

9. The root canal fluid filling method according to claim 6, wherein
in Step 2, the method comprises: calculating, by a control display apparatus, the pressure change rate in the pulp chamber of the tooth to be subjected to root canal therapy, if the pressure change rate in the pulp chamber of the tooth to be subjected to root canal therapy is less than the set threshold, determining that the airtightness between the auxiliary positioning crown and the filling paste capsule as well as the tooth to be subjected to root canal therapy is good;
if the pressure change rate in the pulp chamber of the tooth to be subjected to root canal therapy is greater than the set threshold, determining that air leakage points exist between the auxiliary positioning crown and the filling paste capsule as well as the tooth to be subjected to root canal therapy; and prior to S3, the method further comprises steps of determining a position of the air leakage points and repairing the air leakage points:
adding physiological saline or deionized water into an isolation barrier until a liquid level is over the auxiliary positioning crown, injecting, by the positive and negative pressure generating apparatus, gas into the pulp chamber of the tooth to be subjected to root canal therapy, determining the air leakage point according to a position of bubble generation, and recementing the auxiliary positioning crown or refixing the sealing soft rubber plug and the filling capsule paste until the airtightness between the auxiliary positioning crown and the paste filling capsule as well as the tooth to be subjected to root canal therapy is good.

* * * * *